(12) United States Patent
Cheon et al.

(10) Patent No.: US 7,602,735 B2
(45) Date of Patent: Oct. 13, 2009

(54) METHOD AND APPARATUS FOR ROUTING BETWEEN MOBILE NETWORKS

(75) Inventors: Jung-Hoon Cheon, Suwon-si (KR); Ji-Hoon Lee, Choonglu-si (KR)

(73) Assignee: Samsung Electronics Co., Ltd (KR)

( * ) Notice: Subject to any disclaimer, the term of this patent is extended or adjusted under 35 U.S.C. 154(b) by 836 days.

(21) Appl. No.: 11/221,162

(22) Filed: Sep. 7, 2005

(65) Prior Publication Data
US 2006/0203788 A1 Sep. 14, 2006

(30) Foreign Application Priority Data
Mar. 8, 2005 (KR) .................. 10-2005-0019371

(51) Int. Cl.
*H04L 12/28* (2006.01)
(52) U.S. Cl. .............. 370/254; 370/392; 370/401; 709/220; 709/238
(58) Field of Classification Search .............. None
See application file for complete search history.

(56) References Cited

U.S. PATENT DOCUMENTS

| | | | |
|---|---|---|---|
| 7,190,678 B2 * | 3/2007 | Thubert et al. | 370/254 |
| 7,428,221 B2 * | 9/2008 | Thubert et al. | 370/255 |
| 2003/0231585 A1 * | 12/2003 | Motegi et al. | 370/229 |
| 2004/0057440 A1 * | 3/2004 | Thubert et al. | 370/401 |
| 2004/0202183 A1 | 10/2004 | Thubert et al. | |
| 2005/0073992 A1 * | 4/2005 | Lee et al. | 370/351 |
| 2005/0094594 A1 * | 5/2005 | Roh | 370/328 |

FOREIGN PATENT DOCUMENTS

KR 1020030030329 4/2003

OTHER PUBLICATIONS

Tsai et al., An On-Demand Routing Protocol With Backtracking for Mobile Ad Hoc Networks; 2004 IEEE Wireless Communications and Networking Conference, Mar. 21-25, 2004, pp. 1557-1562.
Ng et al., Taxonomy of Route Optimization Models in the NEMO Context; IETF Standard-Working-Draft, Internet Engineering Task Force, Feb. 21, 2005, pp. 1-37.
Jeong et al., Dn-Proxy Based Route Optimization for Mobile Nodes in Mobile Network; IETF Standard-Working-Draft, Internet Engineering Task Force, Jun. 07, 2003; pp. 1-8.
Narten et al., Neighbor Discovery for IP Version 6 (IPv6); IETF Standard, Internet Engineering Task Force, Dec. 1, 1998; pp. 1-93.
Devarapalli et al., Network Mobility (NEMO) Basic Support Protocol; IETF Standard, Internet Engineering Task Force, Jan. 2005, pp. 1-33.
Lee et al., Route Optimization for Mobile Nodes in Mobile Network Based on Prefix Delegation, IETF Standard-Working-Draft, Internet Engineering Task Force; Feb. 16, 2004, pp. 1-9.

* cited by examiner

*Primary Examiner*—Daniel J Ryman
*Assistant Examiner*—Brian Roberts
(74) *Attorney, Agent, or Firm*—The Farrell Law Firm, LLP (57) ABSTRACT

A method and apparatus for routing between mobile networks without the aid of a home agent by acquiring the internal network prefix of a neighbor mobile network are provided. A routing path is established between the mobile networks using a Route Request (RREQ) message or a Neighbor Discovery message, or an association information manager, for data transmission.

12 Claims, 5 Drawing Sheets

METHOD AND APPARATUS FOR ROUTING BETWEEN MOBILE NETWORKS

PRIORITY

This application claims priority under 35 U.S.C. § 119 to an application entitled "Method And Apparatus For Routing Between Mobile Networks" filed in the Korean Intellectual Property Office on Mar. 8, 2005 and assigned Ser. No. 2005-19371, the contents of which are herein incorporated by reference.

BACKGROUND OF THE INVENTION

1. Field of the Invention

The present invention relates generally to a method and apparatus for routing between mobile networks, and in particular, to a method and apparatus for routing between mobile networks without the aid of a home agent (HA) by acquiring the internal network prefix of a neighbor mobile network.

2. Description of the Related Art

Figure 1:
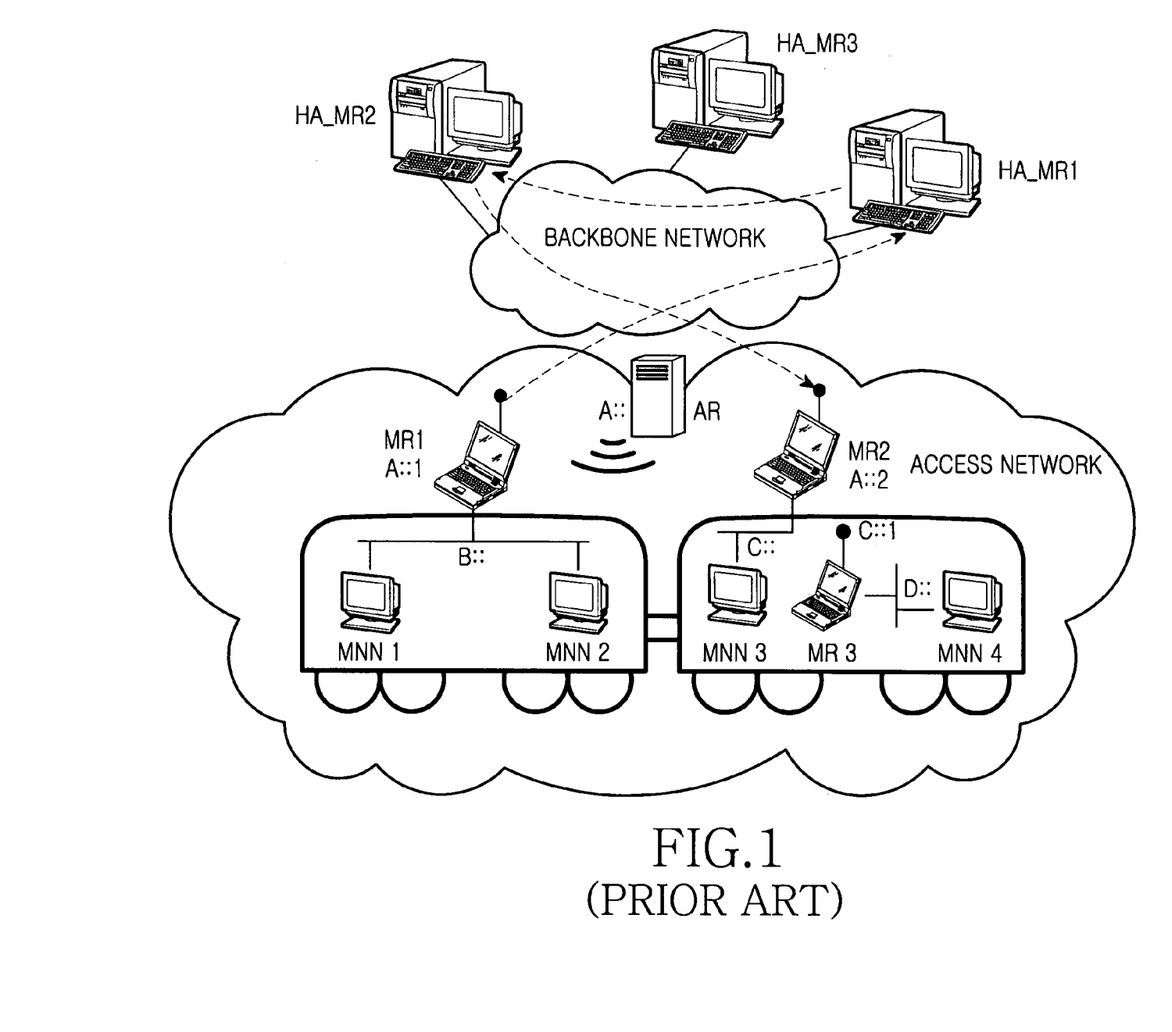
FIG. 1 illustrates an exemplary mobile network configuration.

FIG. 1 is a diagram illustrating an exemplary mobile network configuration. The mobile network is built with one or more mobile routers (MRs) and other mobile network nodes (MNNs). The MNNs communicate with an external network via the MRs. The MRs are connected to a backbone network through an access router (AR), thereby enabling mobile network communications. The AR is accessible by a plurality of MRs and thus, an access network that the AR takes charge of may include a plurality of mobile networks. The backbone network is provided with an HA for supporting seamless communications for mobile networks regardless of movement. In other words, the MRs communicate with the HA through tunnels established between them. Another mobile network may exist within a mobile network by use of an MR.

Referring to FIG. 1, mobile networks access the AR via MR1 and MR2. MNN1 and MNN2 are connected to MR1 and MNN3 is connected to MR2. MR3 with MNN4 is connected to MR2. The backbone network has an HA taking charge of communications for MR1, HA_MR1 and an HA taking charge of communications for MF1, HA_MR2, and an HA taking charge of communications for MR3, HA_MR3.

If MNN1 wants to communicate with MNN3, MR1 transmits data packets to HA_MR1 through a tunnel via the AR. HA_MR1 then transmits the data packets to HA_MR2 according to data packet destination information, and HA_MR2 transmits the data packets to MR3 through a tunnel established between MR2 and HA_MR2 via the AR.

In this case, since the mobile network of MR1 is close to that of MR2, it is preferred that MR1 and MR2 communicate with each other directly without the aid of the HAs associated with MR1 and MR2. However, MR1 has no knowledge of the existence of MR2 the internal network prefix of MR2 under conventional technology. As a result, communications are conducted via HAs associated with MRs.

SUMMARY OF THE INVENTION

An object of the present invention is to provide at least the advantages below. Accordingly, an object of the present invention is to provide a method and apparatus for routing between mobile networks by acquiring information about a neighbor mobile network.

Another object of the present invention is to provide a method and apparatus for routing between mobile networks by acquiring the internal network prefix of a neighbor mobile network.

A further object of the present invention is to provide a method and apparatus for routing between mobile networks through integrated management of the association information of the mobile networks.

The above objects are achieved by providing a method and apparatus for routing between mobile networks without the aid of a home agent by acquiring the internal network prefix of a neighbor mobile network.

According to one aspect of the present invention, in a method of routing between mobile networks each having an MR connected to a backbone network via an access router, for communications, a first MR associated with a first mobile network broadcasts a Rate Request (RREQ) message including the internal network prefix of a destination mobile network and a flag indicating whether the internal network prefix of the destination mobile network is included in the RREQ message, for transmitting a data packet from a first mobile network to the destination mobile network. MRs receive the RREQ message and compare the internal network prefix set in the RREQ message with the internal network prefixes of mobile networks of the MRs. An MR of a mobile network, which has the same internal network prefix as set in the RREQ message, transmits a Route Reply (RREP) message directed to the first MR, including the internal network prefix of the destination mobile network set in the RREQ message and the internal network prefix of the mobile network. An MR of a mobile network having a different internal network prefix from the internal network prefix set in the route request message re-broadcasts the RREQ message. MRs, which have received the RREQ message, store the address of a previous MR from which the RREQ message has been received as a next hop address, and transmit the RREP message directed to the first MR. The first MR receives the RREP message and, if the RREP message has the internal network prefix of the destination mobile network, transmits the data packet using the network prefix of the MR that initially transmitted the RREP message.

According to another aspect of the present invention, in a method of routing between mobile networks each having an MR connected to a backbone network via an access router, for communications, a first MR of a first mobile network broadcasts a neighbor discovery message including the internal network prefix of a destination mobile network and a flag indicating whether the internal network prefix of the destination mobile network is included in the neighbor discovery message, for transmitting a data packet from a first mobile network to the destination mobile network. MRs receive the neighbor discovery message and compare the internal network prefix set in the neighbor discovery message with the internal network prefixes of the mobile networks of the MRs according to the flag. An MR of a mobile network having the same internal network prefix as set in the neighbor discovery message broadcasts a neighbor discovery reply message including the internal network prefix of the destination mobile network set in the neighbor discovery message and the internal network prefix of the mobile network. The first MR receives the neighbor discovery message and transmits the data packet using the network prefix of an MR included in the neighbor discovery reply message, if the neighbor discovery reply message includes the internal network prefix of the destination mobile network.

According to a further aspect of the present invention, in a method of routing between mobile networks using an association information manager for integratedly managing association information of the mobile networks, each of the mobile networks having a mobile router MR connected to a backbone network via an access router, for communications, MRs transmit to the association information manager an association request message including the internal network prefix of each of mobile networks of the MRs. The association information manager stores the internal network prefixes of the mobile networks on an MR basis and transmits an association response message to each of the MRs. The association information manage transmits the internal network prefix information of all the mobile networks to each of the MRs having the internal network prefix information of the mobile network that the each MR belongs to.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The following description is made with the appreciation that mobile networks to which the present invention is applied may be configured as illustrated in FIG. 1, for better understanding of the present invention. More specifically, the network prefix of the AR is A:: and those of MR1 and MR2 that access the AR are A::1 and A::2, respectively. The internal network prefixes of mobile networks under MR1 and MR2 are B:: and C::, respectively. The network prefix of MR3, which forms a mobile network inside the mobile network of MR2 is C::1. The internal network prefix of a mobile network under MR3 is D::.

According to an embodiment of the present invention, mobile network information is acquired by multi-hop routing. For multi-hop routing, modified Route Request (RREQ) and Route Reply (RREP) messages are used.

To communicate with MNN3, MNN1 transmits data packets to MR1, and MR1 broadcasts an RREQ message according to the data packets destination.

The RREQ message is used to establish a path along which the data packets are transmitted to the destination. The RREQ message further includes an N flag for indicating whether the RREQ message includes the internal network prefix of a destination mobile network.

Figure 2:
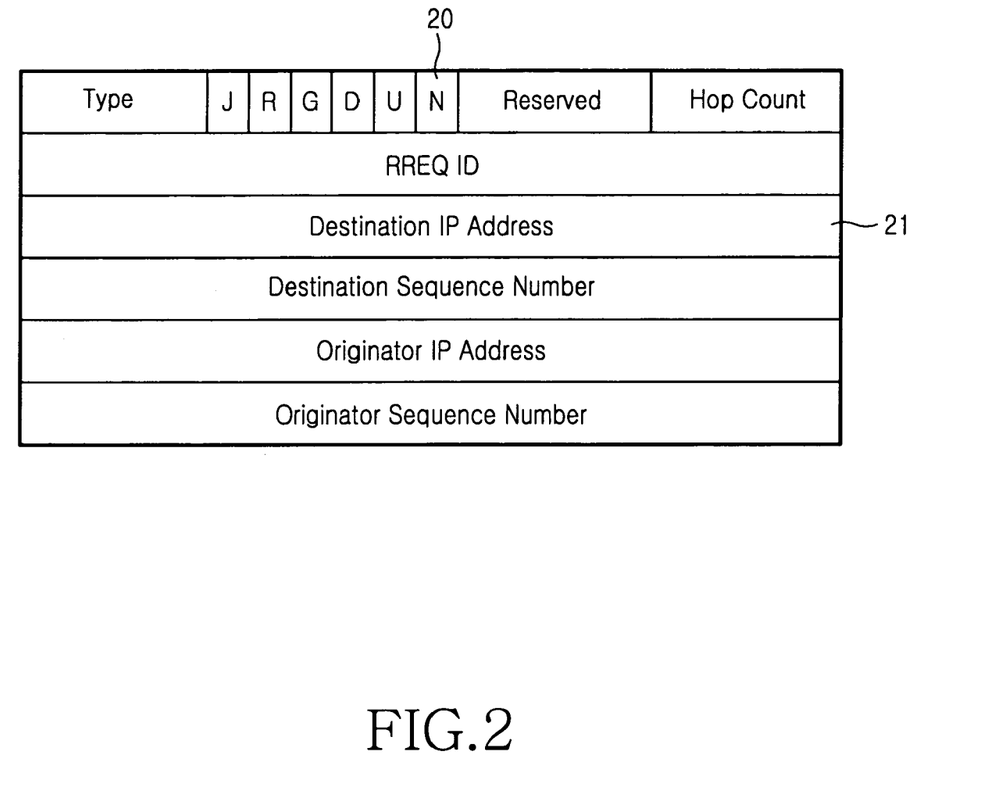
FIG. 2 illustrates the structure of an RREQ message according to an embodiment of the present invention.

FIG. 2 illustrates the structure of the RREQ message according to an embodiment of the present invention. Referring to FIG. 2, the RREQ message has an N flag 20. Destination information, that is, the network prefix (C::) of MNN3, is set in a Destination IP Address field 21.

This RREQ message is broadcast from MR1. An MR, upon receipt of the RREQ message, recognizes, by the N flag 20, that the RREQ message includes the internal network prefix of a mobile network, and compares the network prefix set in the Destination IP Address field 21 of the RREQ message with its own internal network prefix. If they match, the MR transmits an RREP message for the received RREQ message to MR1.

In the case where MR2 receives the RREQ message, MR2 transmits the RREP message to MR1 because the internal network prefix of MR2 is C:: and the network prefix set in the Destination IP Address field 21 is also C::.

This RREP message includes the network prefix of MR1 and the network prefix of MR2. Therefore, if MR1 received the RREP message with its network prefix included, MR1 transmits the data packets received from MNN1 to MR2 based on the network prefix of MR2 set in the RREP message. In other words, the data packets transmitted by MNN1 are delivered to MNN3 via MR1 and MR2 in this order.

On the other hand, if MR1 is far from MR2 and other MRs are positioned between them, the RREQ message initially broadcast from MR1 is delivered to MR2 not directly, but via the MRs between MR1 and MR2. In this case, the RREQ message includes a hop count. The RREP message broadcast from MR2 is also delivered to MR1 via the intervening MRs. Each of the MRs, stores the address of the previous MR that forwarded the RREP message as the next hop message and forwards the RREP message until it reaches MR1.

In accordance with an embodiment of the present invention as described above, routing is carried out between neighbor mobile networks by detecting an optimum route using RREQ and RREP messages, the RREQ message including a flag indicating whether the RREQ message has the internal network prefix of a destination mobile network.

According to an alternative embodiment of the present invention, the mobile network information is acquired by neighbor discovery.

In further detail, mobile network information is acquired by searching neighbor MRs (i.e. neighbor discovery). To do so, a Neighbor Discovery message is used.

To communicate with MNN3, MNN1 transmits data packets to MR1 and MR1 broadcasts a Neighbor Discovery message using the destination of the data packets.

The Neighbor Discovery message is used to search for a neighbor MR. The Neighbor Discovery message further includes an N flag indicating whether the internal network prefix of a destination mobile network is included in the Neighbor Discovery message.

Figure 4:
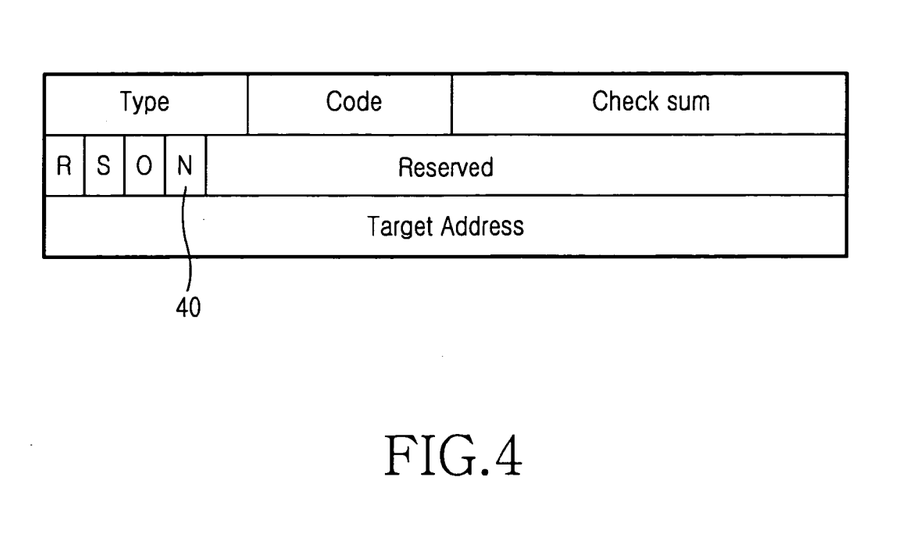
FIG. 4 illustrates the structure of a Neighbor Discovery message according to an alternative embodiment of the present invention.
Figure 5:
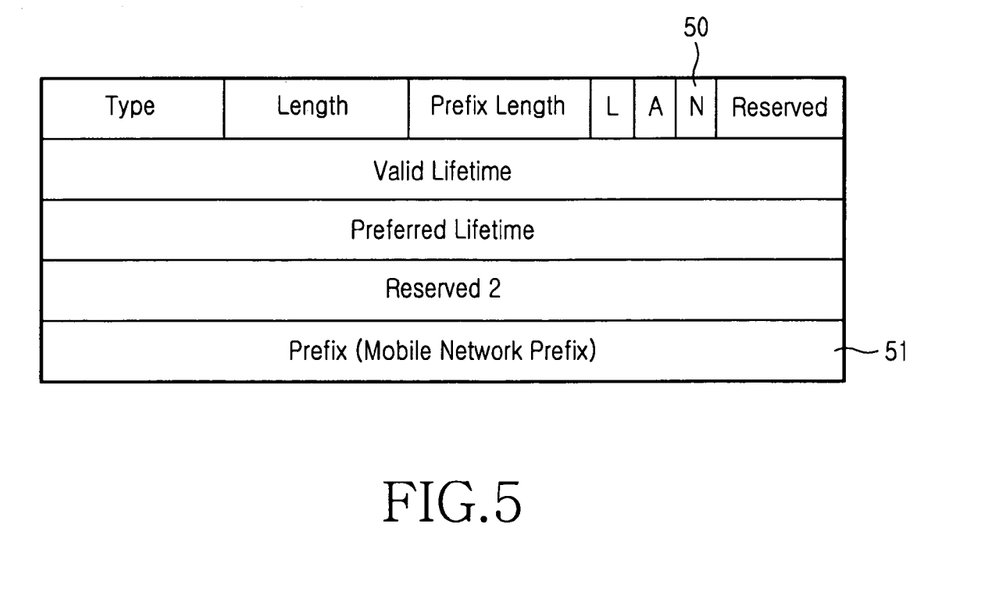
FIG. 5 illustrates the structure of a prefix information option area in the Neighbor Discovery message of FIG. 4.

FIG. 4 illustrates the structure of the Neighbor Discovery message according to the alternative embodiment of the present invention. Referring to FIG. 4, the Neighbor Discovery message has an N flag 40. A Prefix Information option in the Neighbor Discovery message includes an N flag 50 and a Prefix field 51 with the destination, that is, the network prefix (C::) of MNN 3 set as shown in FIG. 5.

This Neighbor Discovery message is broadcast from MR1, especially at Layer 3.

An MR, upon receipt of the Neighbor Discovery message, recognizes by the N flags 40 and 50 that the Neighbor Discovery message includes the internal network prefix of a mobile network and compares the network prefix set in a Prefix field 51 of the Neighbor Discovery message with its own internal network prefix. If they are identical, the MR broadcasts a Neighbor Discovery Reply message for the received Neighbor Discovery message.

In the case where MR2, being close to MR1, receives the Neighbor Discovery message, MR2 transmits a Neighbor Discovery Reply message to MR1 because the internal network prefix of MR2 is C:: and the network prefix set in the Prefix field 51 is also C::. The Neighbor Discovery Reply message is broadcast directly to MR1 without involving other MRs.

The Neighbor Discovery Reply message includes the network prefix of the MR that broadcast it. An MR, upon receipt of the Neighbor Discovery Reply message, transmits data packets to the MR that broadcasted the Neighbor Discovery Reply message. In other words, because MR2 broadcast the Neighbor Discovery Reply message to MR1, MR1 transmits the data packets received from MNN1 to MR2.

In accordance with the alternative embodiment of the present invention, routing is performed between neighbor mobile networks by directly detecting an MR having the internal network prefix of a destination mobile network according to a Neighbor Discovery message having a flag indicating whether the Neighbor Discovery message includes the internal network prefix of the destination mobile network.

According to a further alternative embodiment of the present invention, the association information of mobile networks is integratedly managed and routing is carried out between the mobile networks based on association information.

Each MR transmits information about the internal network prefix of a mobile network under the MR to an association information manager. The association information manager provides MRs under its management with association information each time the association information is updated, or at every predetermined time period. Therefore, it is preferred that an AR, to which the MRs are connected, serves as the association information manager. Alternatively, one of the MRs can be the association information manager. In addition, an existing device for integrated management it all MRs can be used as the association information manager, or such a device may be separately procured.

The association information manager has an association table with information about the MRs and the internal network prefixes of mobile networks associated with the MRs. Table 1 below illustrates such an association table.

TABLE 1

| Name | MR Flag | Internal Network Prefix of Mobile Network | Remarks |
|---|---|---|---|
| MR1 | 1 | B:: | |
| MR2 | 1 | C:: | |

In Table 1, under "Name" there are the names of MRs from which association information has been received. "MR Flag" is set to 1 if a router is an MR, that is, if association information is about a mobile network. "Internal Network Prefix of Mobile Network" is the internal network prefix of a mobile network that an MR takes charge of. Since "MR1" and "MR2" are all MRs, "MR flag" values are is. Values of "Internal Network Prefix of Mobile Network" are B:: for MR1 and C:: for MR2.

Figure 3:
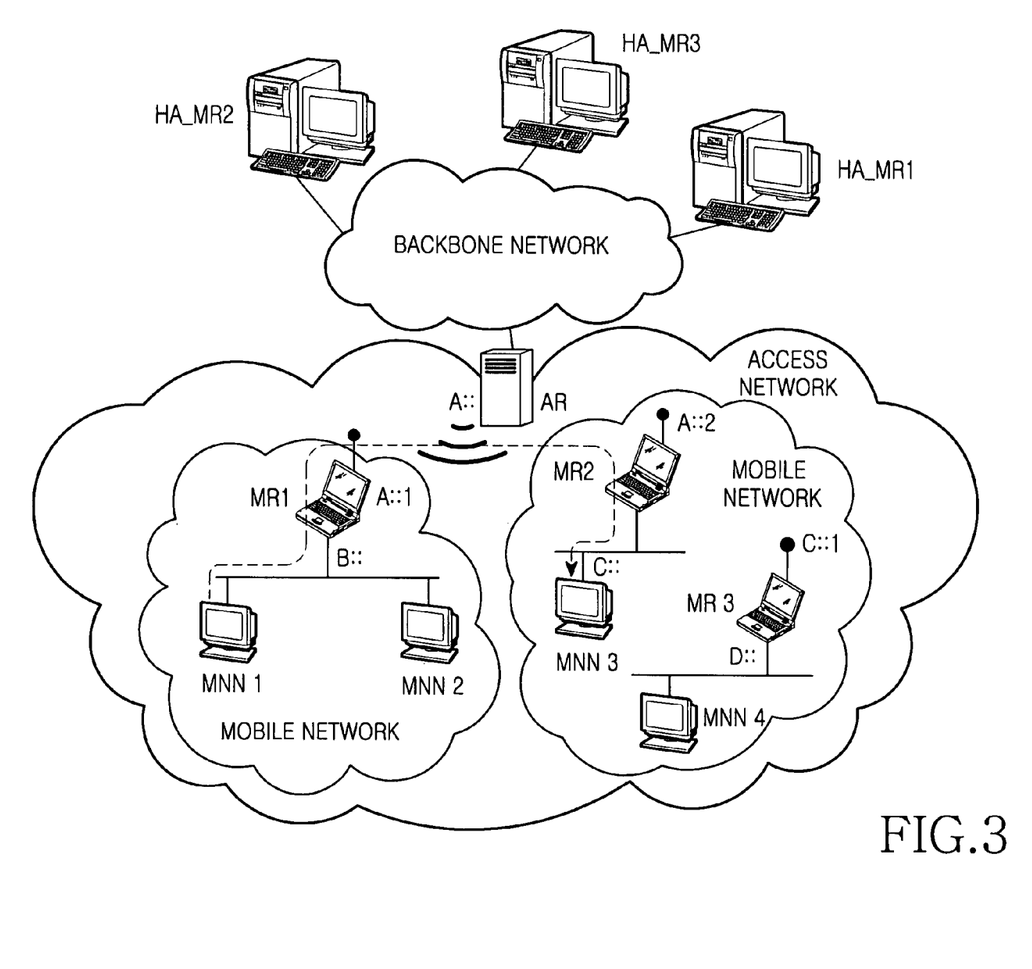
FIG. 3 illustrates a routing path according to an embodiment of the present invention.

FIG. 3 illustrate three mobile networks accessing one access network in which a method of transmitting/receiving association information between an AR and MRs is implemented. It is assumed that the AR functions as an association information manager.

Figure 6:
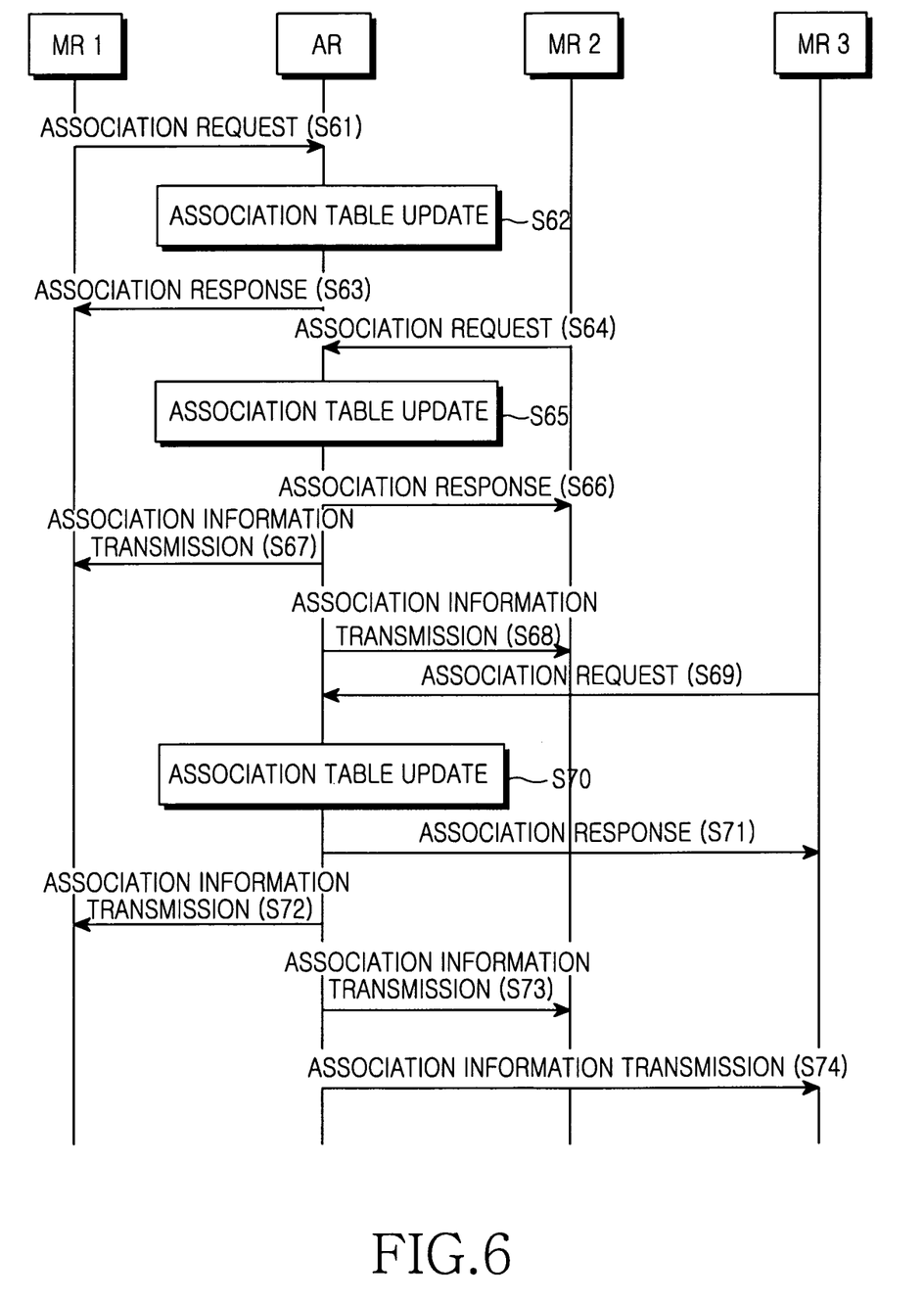
FIG. 6 is a flowchart illustrating an operation for managing association information about mobile networks according to a further alternative embodiment of the present invention.

FIG. 6 is a flowchart illustrating an operation for managing information about an association between mobile networks according to the further alternative embodiment of the present invention.

Referring to FIG. 6, to access the AR and thus form a mobile network, MR1 first establishes a network connection with the AR and requests an association to the AR by an "ASSOCIATION REQUEST" message in step S61. The "ASSOCIATION REQUEST" message includes the internal network prefix of the mobile network of MR1.

Upon receipt of the "ASSOCIATION REQUEST" message, the AR adds MR1 to an association table and updates association information in step S62. In step S63, the AR transmits to MR1 an "ASSOCIATION RESPONSE" message indicating that MR1 is associated with the AR.

In this way, information about mobile networks is stored in the association table. Preferably, the transmission of the "ASSOCIATION REQUEST" message and the "ASSOCIATION RESPONSE" message is carried out at Layer 2.

As to MR2, to access the AR and thus form a mobile network, MR2 first establishes a network connection with the AR and requests an association to the AR by an "ASSOCIATION REQUEST" message in step S64, like MR1. Upon receipt of the "ASSOCIATION REQUEST" message, the AR adds MR2 to the association table and updates the association information in step S64. In step S66, the AR transmits to MR2 an "ASSOCIATION RESPONSE" message indicating that the association has been made.

If the AR is set to provide the association information to the MRs under its management at a predetermined time, it notifies the MRs of the latest association information updated until before the notification in steps S67 and S68. The association information sent to an MR includes the association information of all MRs managed in the association table, not limited to the association information between the AR and the MR. Accordingly, since each MR can gain knowledge of the internal network prefixes of mobile networks formed by the other MRs that have had an association with the AR, the MR routes data packets directly to the MR of a destination mobile network. It is preferred that the association information is provided to all MRs simultaneously. The AR transmits the association information preferably by a Neighbor Advertisement message, preferably at Layer 2.

If MR3 also wants to access the AR and thus forms a mobile network, it first establishes a network connection with the AR and requests an association to the AR by an "ASSOCIATION REQUEST" message in step S69, like MR1 and MR2. Upon receipt of the "ASSOCIATION REQUEST" message, the AR adds MR3 to the association table and updates the association information in step S70. In step S71, the AR transmits to MR3 an "ASSOCIATION RESPONSE" message indicating that the association has been made.

If the AR is set to provide the association information to each of the MRs under its management at each update of the association information, it notifies the MRs of the latest association information updated until before the notification in steps S72 and S73. It is preferred that the association information is sent to the MRs simultaneously.

In the case where the association information manager is configured separately from the MRs, each MR establishes a network connection to the AR and then transmits an association request message including the internal network prefix of its mobile network to the association information manager. The association information manager then transmits to the MR an association response message indicating that an association has been made between them. Provisioning of association information to MRs is carried out as described above.

On the other hand, in the case where the association information manager is incorporated in one of the MRs, the MR having the association information manager would not transmit an association request message and an association response message because it already has its own information.

According to the above-described further alternative embodiment of the present invention routing is carried out between neighbor mobile networks by configuring an association information manager for integrated management of the internal network prefixes of mobile networks and providing association information to each MR by the association information manager.

As described above, the present invention provides an optimum routing path between neighbor mobile networks through multi-hop routing, neighbor discovery, or integrated management of the association information of mobile networks. With the use of the positional characteristics of nodes in a mobile network environment, problems including excess traffic caused by unnecessary establishment of routing paths are efficiently overcome.

In addition, the load of HAs is reduced by routing between mobile networks without the aid of the HAs. Furthermore, the use of multi-hop routing reduces the amount of data traffic within a backbone network.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for routing between Mobile Networks (MNs), each of the MNs including a Mobile Router (MR) connected to a backbone network via an access router for transmitting a data packet from a first MN to a second MN, the method comprising:

broadcasting, by a first MR of the first MN, a first message including a flag indicating if an internal network prefix of a destination MN is included in the first message;

receiving, by a second MR of the second MN, the first message;

determining, by the second MR, if the internal network prefix is included in the first message based on the flag;

comparing, by the second MR, the internal network prefix included in the first message with an internal network prefix of the second MR, when the internal network prefix is included in the first message;

broadcasting, by the second MR, a second message including an internal network prefix of the first MN and the internal network prefix of the second MN, when the internal network prefix included in the first message corresponds to the internal network prefix of the second MR;

receiving, by the first MR, the second message; and transmitting, by the first MR, the data packet using the internal network prefix of the second MR included in the second message, when the second message includes the internal network prefix of the destination MN.

2. The method of claim 1, further comprising re-broadcasting, by the second MR, the first message, when the internal network prefix included in the first message does not correspond to the internal network prefix of the second MR.

3. The method of claim 1, wherein the first message includes a hop count number.

4. The method of claim 1, wherein when a third MR receives the second message, the third MR stores an address of a MR that transmitted the second message as a next hop address, and transmits the second message to the first MR.

5. The method of claim 1, the first message includes a Route REQuest (RREQ) message and the second message includes a Route REPly (RREP) message.

6. The method of claim 1, the first message includes a neighbor discovery message and the second message includes a neighbor discovery reply message.

7. A system for routing between Mobile Networks (MNs), each of the MNs including a Mobile Router (MR) connected to a backbone network via an access router for transmitting a data packet from a first MN to a second MN, the apparatus comprising:

a first MR of the first MN for broadcasting a first message including a flag indicating if an internal network prefix of a destination MN is included in the first message; and a second MR of the second MN for receiving the first message, determining if the internal network prefix is included in the first message based on the flag, comparing the internal network prefix included in the first message with an internal network prefix of the second MR, when the internal network prefix is included in the first message, and broadcasting a second message including an internal network prefix of the first MN and the internal network prefix of the second MN when the internal network prefix included in the first message corresponds to the internal network prefix of the second MR, wherein the first MR receives the second message and transmits the data packet using the internal network prefix of the second MR included in the second message, when the second message includes the internal network prefix of the destination MN.

8. The system of claim 7, wherein the second MR re-broadcasts the first message, when the internal network prefix included in the first message does not correspond to the internal network prefix of the second MR.

9. The system of claim 7, wherein the first message comprises a hop count number.

10. The system of claim 7, further comprising a third MR for receiving the second message, storing an address of a MR that transmitted the second message as a next hop address, and transmitting the second message to the first MR.

11. The system of claim 7, wherein the first message comprises a Route REQuest (RREQ) message and the second message comprises a Route REPly (RREP) message.

12. The system of claim 7, wherein the first message comprises a neighbor discovery message and the second message comprises a neighbor discovery reply message.

* * * * *

UNITED STATES PATENT AND TRADEMARK OFFICE
CERTIFICATE OF CORRECTION

PATENT NO. : 7,602,735 B2
APPLICATION NO. : 11/221162
DATED : October 13, 2009
INVENTOR(S) : Cheon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Fourteenth Day of December, 2010

David J. Kappos
*Director of the United States Patent and Trademark Office*